March 14, 1933.  J. D. PHILLIPS  1,901,329
RUMBLE SEAT WINDOW APPLIANCE
Filed Nov. 10, 1931   2 Sheets-Sheet 1
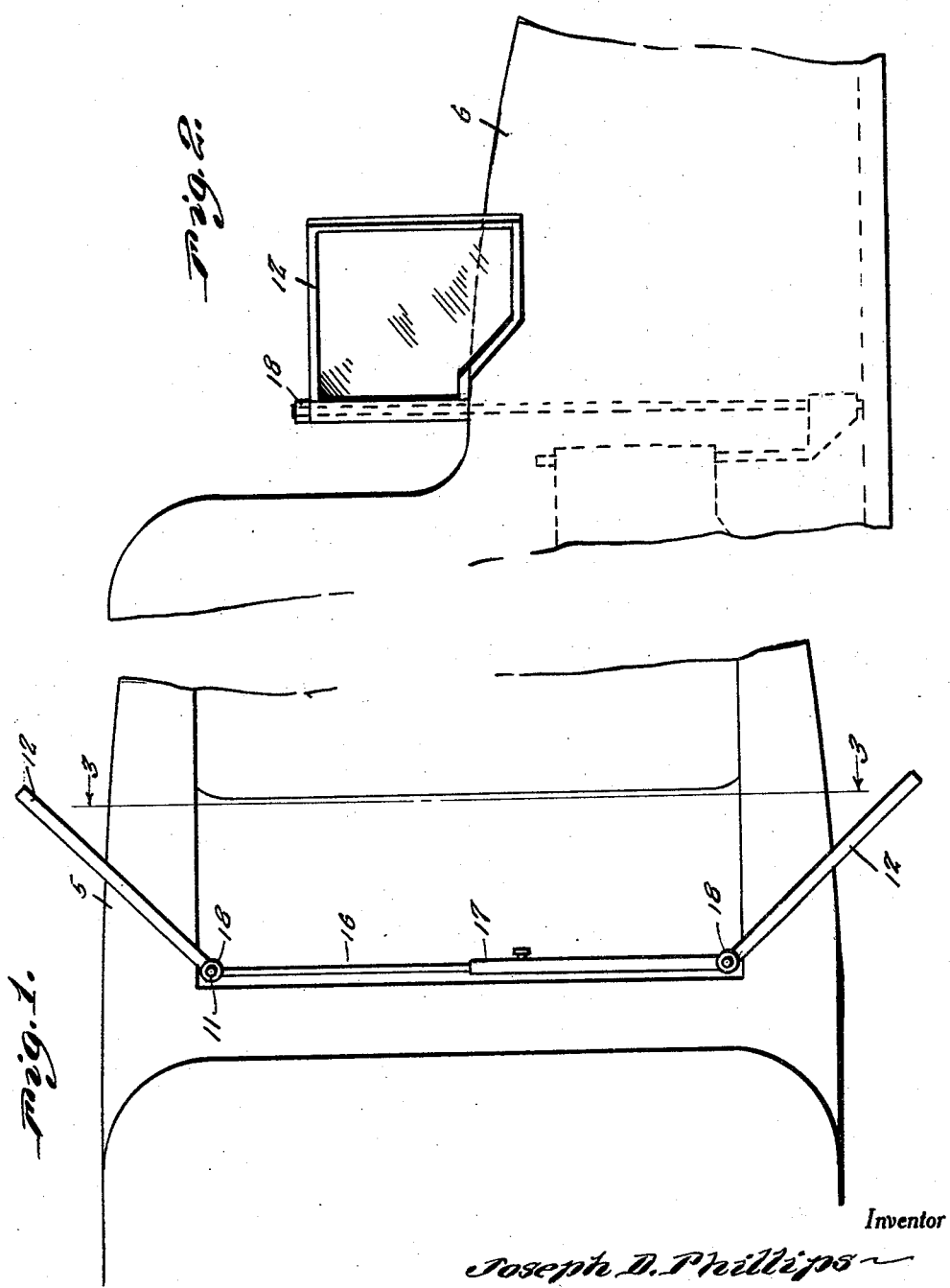

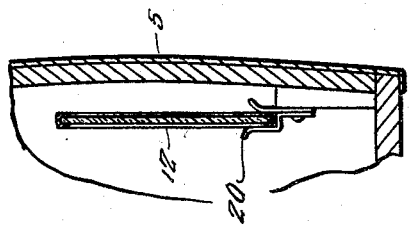
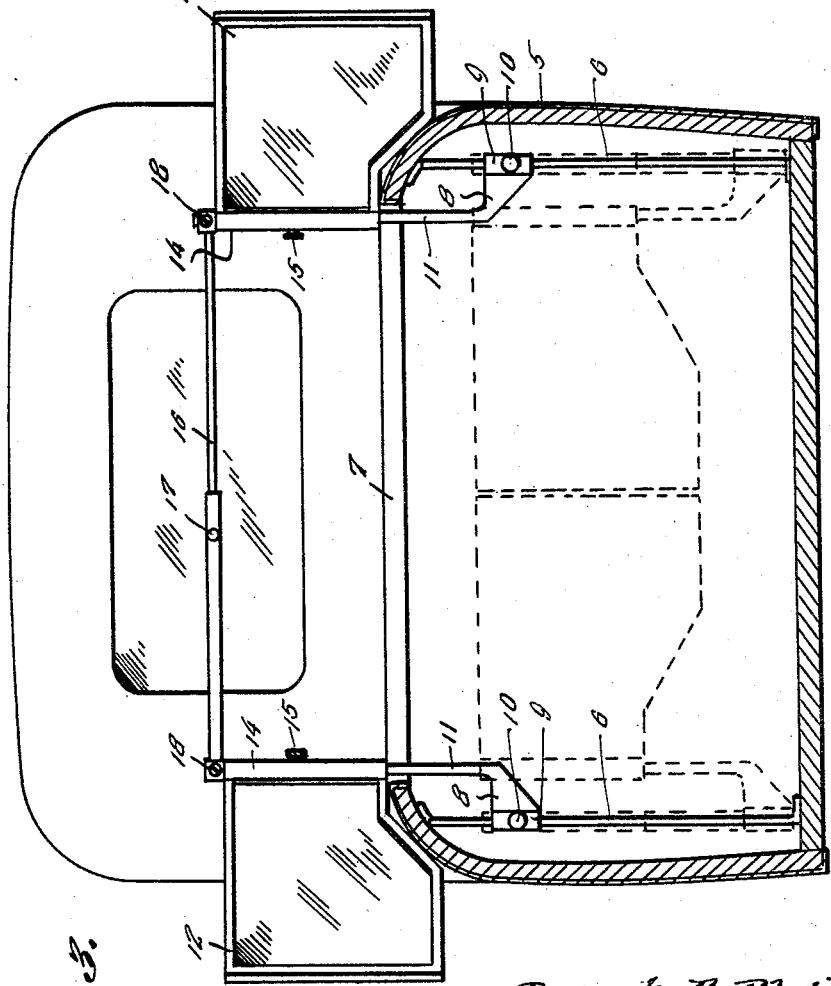

Patented Mar. 14, 1933

1,901,329

UNITED STATES PATENT OFFICE

JOSEPH D. PHILLIPS, OF HELENA, MONTANA, ASSIGNOR OF ONE-HALF TO JOHN E. PHILLIPS, OF HELENA, MONTANA

RUMBLE SEAT WINDOW APPLIANCE

Application filed November 10, 1931. Serial No. 576,293.

The present invention relates to a rumble seat windshield appliance and has for its prime object to provide an appliance which may be mounted in the rumble seat compartment of an automobile so that windshield frames may be adjusted to extend outwardly of the compartment when in use or may be swung inwardly and adjusted downwardly into the rumble seat compartment in an out of the way position.

Another very important object of the invention resides in the provision of an appliance of this nature which is simple in its construction, inexpensive to manufacture and install, easy to manipulate, and thoroughly efficient and reliable in use.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the appliance showing portions of the automobile.

Figure 2 is a side elevation thereof.

Figure 3 is a vertical transverse section taken substantially on the line 3—3 of Figure 1, and Figure 4 is a detail section showing one of the shield sections mounted inside the rumble seat compartment.

Referring to the drawings in detail it will be seen that numeral 5 denotes generally the rumble seat compartment of an automobile and in this compartment there is mounted a pair of vertical bars 6 to the sides of the opening 7 of the compartment and adjacent the forward end thereof. Brackets 8 are formed with sleeves 9 slidable on the bars 6 and held in adjusted position by set screws 10. Rods 11 rise from the brackets 8 and may be extended through the opening 7 when the brackets 8 are in raised position on the bars 6 as shown particularly in Figure 3.

Numerals 12 denote windshield sections the frames of which are provided with vertical sleeves 14 rockable and slidable on the rods 11 and held in adjusted position by set screws 15. An adjustable brace rod 16 is formed in telescopically associated sections held in adjusted position by set screw 17 and the ends of the brace rod 16 are engaged as at 18 on the upper ends of the rods 11. By loosening the set screws 15, considering particularly Figure 3, it will be seen that the shield sections may be swung inwardly and then by loosening the set screws 10 the brackets may be lowered and the shields will therefore be lowered inside the rumble seat compartment. When the shields are inside the rumble seat compartment I prefer to provide spring clip brackets 20 to support them and prevent rattling and the like. When the ends of the seats are spaced from the side walls of the compartment, these brackets 20 may be placed between said ends of the seats and said side walls, as shown in Fig. 4, so that the windshields can be partly placed between the ends of the seat and side walls to engage the said brackets.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with a rumble seat compartment of an automobile, a pair of vertically arranged rods located in the front part of the compartment, one adjacent each side thereof and having their lower ends connected with the bottom of the compartment and their upper ends with portions of the top thereof, a pair of substantially horizontal brackets, each having a vertically arranged sleeve thereon through which a rod passes, whereby each bracket is slidably and rotatably mounted on its rod, a set screw passing through each sleeve engaging the rod for holding the bracket in adjusted position, a second pair of vertically arranged rods having their lower ends connected with those ends of the brackets which are opposite the ends carrying the sleeves, whereby the second pair of rods are offset from the first pair and can pass through the top opening of the compartment when the brackets are moved upwardly on the first pair of rods, a rod adjustable as to its length having its ends detachably connected to the upper ends of the second pair of rods, a pair of windshield frames, each having a sleeve at one side thereof for telescoping a rod of the second pair, a set screw passing through the sleeve last-mentioned and engaging the last-mentioned rod to hold the frame in adjusted position, and clips in the compartment for engaging the frames, when the same have been lowered in the compartment, to hold said frames against rattling.

In testimony whereof I affix my signature.

JOSEPH D. PHILLIPS.